May 17, 1949.  C. F. AVILA  2,470,455
AUTOMATIC ALTITUDE AND PRESSURE COMPENSATOR
FOR AERIAL CAMERA LENS
Filed June 18, 1946  3 Sheets-Sheet 3

INVENTOR
CHARLES F. AVILA
BY
ATTORNEYS.

Patented May 17, 1949

2,470,455

UNITED STATES PATENT OFFICE 2,470,455

AUTOMATIC ALTITUDE AND PRESSURE COMPENSATOR FOR AERIAL CAMERA LENSES

Charles F. Avila, Milton, Mass., assignor to the United States of America as represented by the Secretary of War Application June 18, 1946, Serial No. 677,620

10 Claims. (Cl. 95—45)

1

The invention described herein may be manufactured and used by or for the Government for governmental purposes without payment to me of any royalty thereon.

This invention relates to automatic pressure and altitude compensators for the stabilization of the focus of an aerial camera lens as used in aviation.

The focus of an aerial camera lens varies with altitude, especially because of two effects. First, the distance from the airborne camera to the ground, which is sufficiently finite to enable a person to shift the focus from infinite position by a definite and easily detectable amount. Second, in ascending into the higher altitude the air becomes rarified and the air pressure gradually diminishes, in view of which the lenses then become optically more refractive so that the focus is thereby shifted and moves nearer the lens during such ascent. For instance, in the case of the 40-inch F/5.0 telephoto lens installed at Harvard College Observatory the shift of focus for these two above-mentioned effects exceeded by far the detectable depth of focus in the air, and it consequently appeared advisable to install an automatic compensating device whereby to keep the focus fixed regardless of altitude. The rear optical element or rear lens of the series of lenses of said 40-inch telephoto lens is particularly insensitive to image aberrations, yet when moved along the optical axis it produces a rather rapid change of focal position, thus adapting said rear lens especially for the application of my invention thereto.

It is an object of this invention to provide the lens mechanism of an aerial camera, that is to be carried into high altitudes, with a device or means which will function automatically to move at least one lens of its series of lenses along the optical axis in response to such altitude change, whereby to compensate for the variation in the focal position caused by such change of altitude and atmospheric pressure.

Another object of this invention is to provide compensating means in the lens mechanism of an airborne camera for automatically moving one of a series of lenses, due to change in altitude and accompanying change in atmospheric pressure, so as to compensate for the shift of focal position ordinarily produced as the lenses become optically more refractive on going to higher altitudes, and instead retain the focus substantially fixed regardless of altitude.

A more particular object of this invention is to provide, for use in an aerial camera, a lens device comprising bellows and springs which in effect carry suspended therebetween the rear optical element of a series of such elements, in such a manner as to move said element automatically along its optical axis, in response to variation in atmospheric pressure due to change in altitude, by an amount which will compensate for the usual shift of focus due to such variation and thus keep the focus fixed.

These and various other objects and advantages are attained with this invention, as will become apparent from the following description, taken in connection with the accompanying drawings wherein the invention is shown in its preferred form, it being evident that other arrangements and forms of construction may be resorted to in carrying out the object and purposes of this invention.

In the drawings:

Fig. 3 is a cross-sectional view on line 3—3 of Fig. 2.

Figure 1:
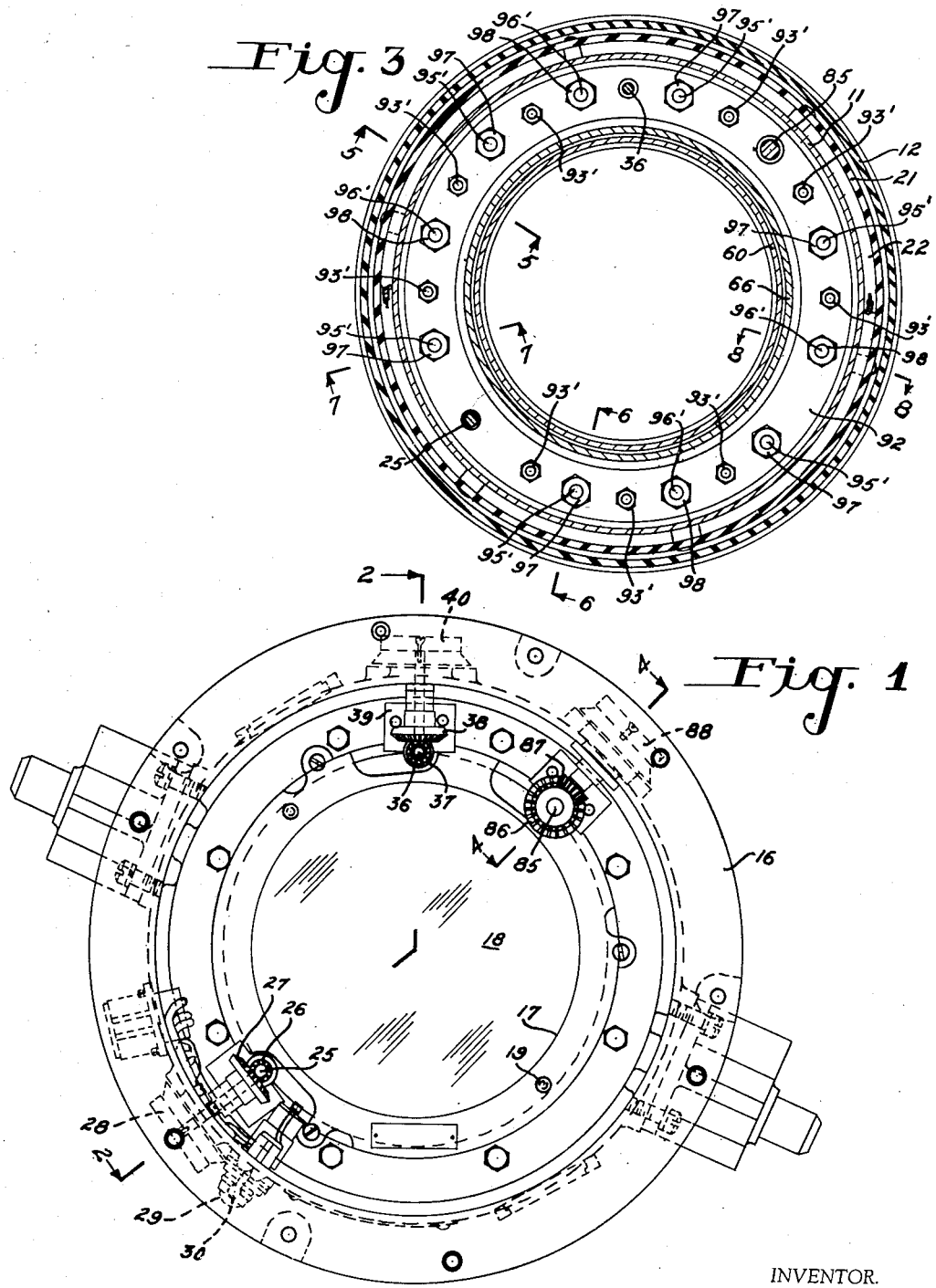
Fig. 1 is an end view of the telephoto device having my invention applied thereto.

Figs. 5, 6, 7 and 8 are enlarged detail sectional views, taken respectively on lines 5—5, 6—6, 7—7, and 8—8 of Fig. 3.

The drawings as illustrated herein disclose a telephoto lens device for use in conjunction with an aerial camera and wherein my altitude and pressure compensator is incorporated. This device comprises a main tubular member 11 substantially in the form of a barrel and being provided with an outer jacket 12 surrounding said main member in spaced relation. A front hood 13 carries an annular flange 14 which extends rearwardly and is interposed between the forward ends of said member and jacket. A flanged member 15 is mounted between the rearward ends of said member and jacket and a tubular adapter 16 extends rearward thereof. A filter cell 17 with its various colored filters 18 and filter grips 19 are mounted within said adapter 16 and flanged member 15.

Figure 2:
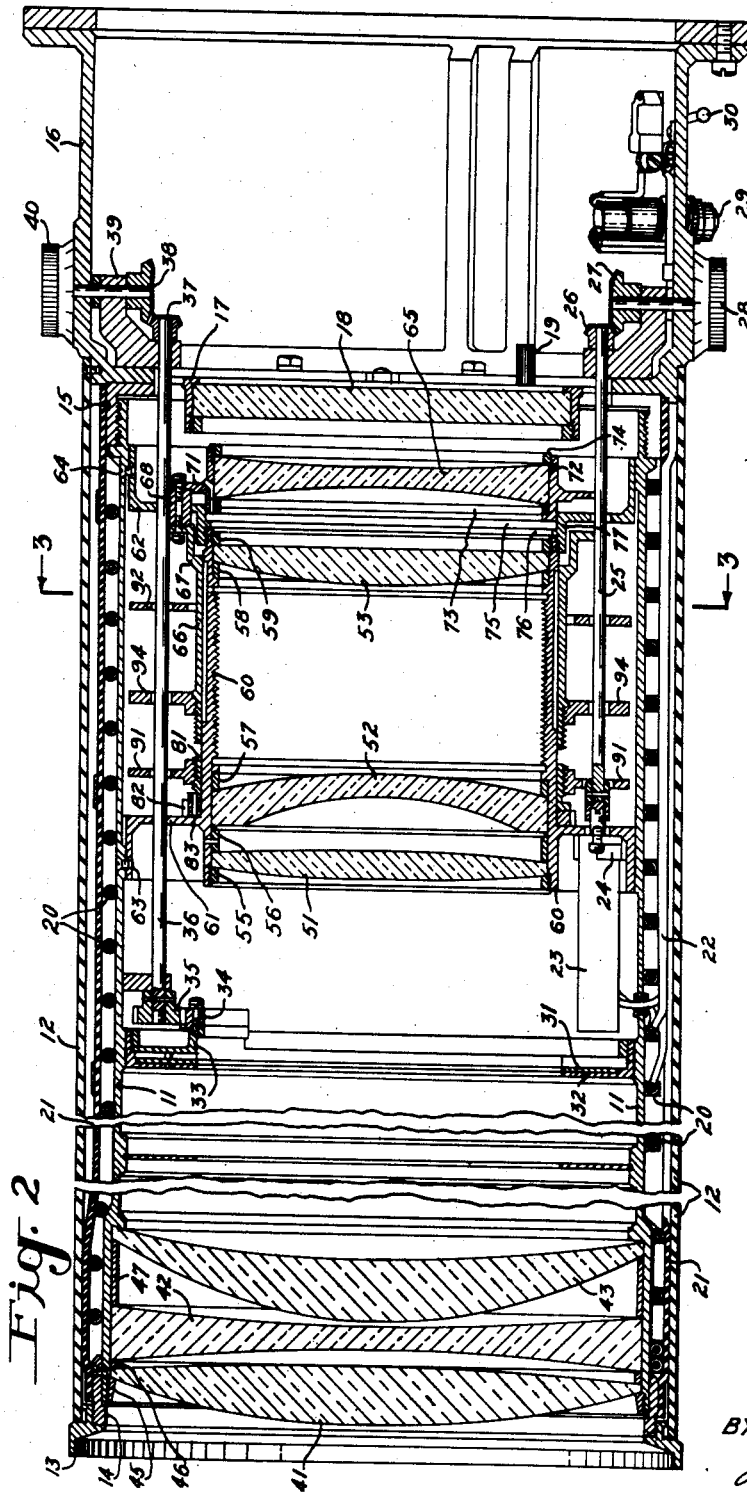
Fig. 2 is a longitudinal sectional view thereof on two intersecting planes, taken on the bent line 2—2 of Fig. 1.

As best shown in Fig. 2, a heater 20 with surrounding insulation 21 and the electric wiring 22 are mounted in the annular space between the main member or barrel 11 and the jacket 12, said wiring leading to the thermostat 23 which is mounted in said barrel by means 24 and is adjustable by its control shaft 25 and bevel gears 26 and 27 actuated by the control knob 28. A thermostat indicating lamp 29 is mounted on the tubular adapter 16 and is provided with a lamp switch 30. An iris leaf 31 is mounted in an iris main plate 32 which is secured in said barrel 11, and said plate has attached thereto an iris rotating plate 33 which is provided with a sector gear 34 actuated through a pinion 35 secured on a shaft 36 operated by bevel gears 37 and 38 supported in a casing 39 and rotated through an iris control knob 40.

The optical elements or lenses included in this telephoto device comprise a plurality of optically aligned lenses including a set of front lenses 41, 42 and 43 mounted in place in the forward end of barrel 11 by suitable retainer rings 45, 46 and 47 secured in the barrel by suitable securing means. Said aligned lenses also include a set of intermediate optical elements or lenses 51, 52 and 53 which are fastened in place by rings 55, 56, 57, 58 and 59 and suitable securing means within a lens barrel 60, said lens barrel being mounted inwardly spaced within the rearward part of the main barrel 11 by an integral front flange 61 and a detachable rear flange member 62 and the use of suitable securing screws 63 and 64 in said flanges.

By my invention a rear lens 65, which is mounted rearward of and adjacent to the lens 53, is arranged for automatic movement for a slight distance along the optical axis of the lenses, so as to compensate automatically for the shift of focus or image movement due to variations in altitude and ambient pressure. Such automatic compensating movement of the rear lens is preferably accomplished by the use of a focusing member 66 which is substantially in the shape of a barrel surrounding the lens barrel 60 so as to be slidable longitudinally thereon, as best shown in Fig. 2. This barrel 66 has an integral flange 67 thereon and a plurality of spacing sleeves 68 extend rearward from this flange 67 through suitable apertures provided in the stationary rear flange 62. Said sleeves 68 are secured at their rear ends to a flange 71 on an annular cell 72 wherein is mounted said rear optical element or rear lens 65 and is held by retainer rings 73 and 74 fastened in said cell. The cell 72 and the rear lens 65 therein are thus movable or shiftable along the optical axis of this mechanism for a short distance forwardly through the space 75 existing between the forward end of said cell 72 and an annular flange 76 projecting radially inwardly in the cylindrical inner part 77 of rear flange 62, and the cell and the rear lens are also similarly movable a short distance rearwardly.

Figure 4:
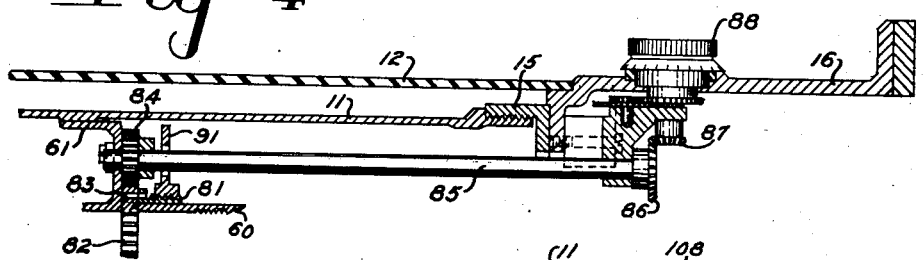
Fig. 4 is a partial sectional view on line 4—4 of Fig. 1.

The focus setting mechanism of this rear lens, whereby the focus is adjustable manually in a known manner, as best seen in Figs. 2 and 4, has my automatic compensating means combined therewith. Said manual setting mechanism comprises a threaded collar 81 secured to a ring gear 82, as by elements 83, so as to rotate with the gear when that is actuated by an engaging pinion 84. The pinion is actuated by a shaft 85 through bevel gears 86 and 87 operated by the focus setting control knob 88. A base ring 91 has threaded engagement with said collar 81, so that rotation of the collar 81 will shift and adjust the ring 91 longitudinally along the collar, parallel to the optical axis of the lenses. A thrust ring or head member 92 is mounted spaced around and movable longitudinally of the focusing barrel 66 and, as best seen in Fig. 5, is connected to and carried by the base ring 91, by means of a plurality of spacing sleeves 93 and securing bolts 93' with fastening nuts thereon, all suitably spaced around said barrel 66.

Figure 6:
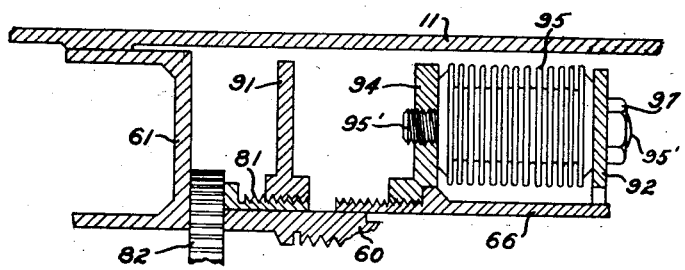
Figure 8:
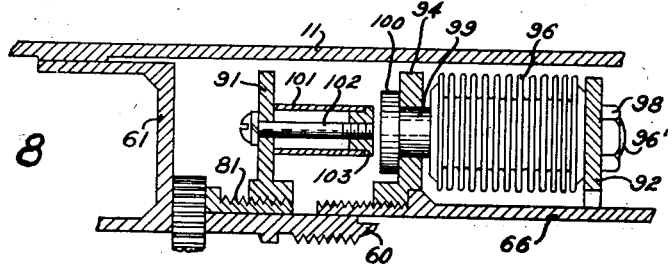
Figure 7:
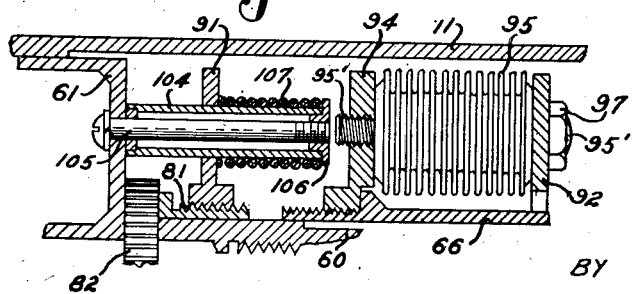

In conjunction with the above described movable focusing barrel 66 and its rear lens 65 and the manually adjustable rings 91 and 92 a movable compensating ring 94 is utilized which is fixedly mounted on the forward end of barrel 66 so as to move therewith. A plurality of pressure responsive means, which are preferably in the form of bellows, and a set of control members, which are preferably in the form of control springs, are connected with this movable ring 94, so that the rear lens 65 which moves along with this ring is thereby in effect suspended between these bellows and springs and is automatically shifted therewith. These bellows comprise a set of main bellows 95, as shown in Figs. 6 and 7, six bellows herein, which are filled with dry nitrogen to the equivalent of 1370 mm. Hg, so as to exert an expanding effect substantially from the beginning of the ascent of an aircraft carrying this telephoto lens; and also a set of auxiliary bellows 96, as shown in Fig. 8, four bellows herein, which are filled with dry nitrogen to the equivalent of 340 mm. Hg, being thus partly evacuated. These bellows 95 are interposed between and with their end stems 95' are secured to the rings 92 and 94, while a securing nut 97 is fastened on each rearward stem 95' to the rear of said ring 92. The bellows 96 has similar end stems 96' with a nut 98 on the rearward stem, but on the forward stem of each of these bellows 96 is threaded a cap 99 which extends through an aperture in the movable ring 94 and has a peripheral top flange 100 projecting across and engaging the front face of said ring. A stop sleeve 101 is secured by a bolt 102 and a nut 103 to the rear face of base ring 91, being positioned so as to limit any excessive forward movement of the cap 99 and the bellows 96, and thus limit the action of these auxiliary bellows on the movement of the movable ring 94 with the barrel 66 and the rear lens 65.

Referring to Fig. 7, several of the six main bellows 95 are provided each with a spacing sleeve 104 positioned forwardly of the bellows, being mounted on the flange 61 by a bolt 105 and a nut 106. The sleeve extends through base ring 91 and has a setting spring 107 thereon confined between said ring 91 and the head of said nut 106, aiding to retain this ring in its set position.

Figure 5:
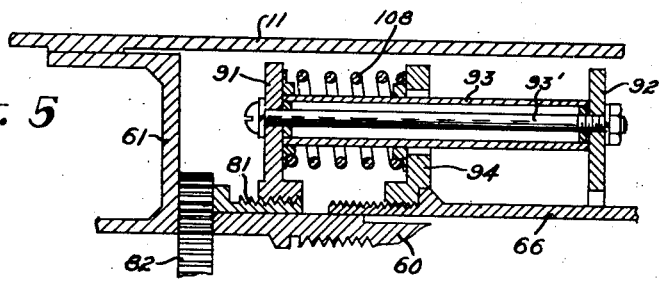

Referring to Fig. 5, a set of control springs 108 is interposed between the base ring 91 and the movable ring 94, using nine springs herein, and a spring being mounted on each spacing sleeve 93. These springs thus provide the proper control on the lens movement due to their retarding and steadying effect on the expanding bellows and the forward shifting of the movable ring 94 and of the rear lens 65, acting contra to the forward pressure exerted by these expanding bellows in moving into higher altitudes and rarer atmosphere.

With this structural arrangement as disclosed herein the rear element or lens 65 is in effect suspended between the group of springs 108 and the sets of bellows 95 and 96, whereof the bellows 95 are inflated to a pressure above and nearly to double the atmospheric pressure at sea level, and the bellows 96 are deflated to a pressure less than half of such atmospheric pressure. Any change in the external atmospheric pressure, due to change of altitude, causes the bellows to expand while ascending and to contract while descending, thus resulting in relative forward or backward movement of the movable ring 94 and the rear lens 65 and therewith provide the adjustment to keep the focus fixed regardless of altitude.

The actual calculation of the change of focus with altitude is curvilinear, while the two sets of bellows 95 and 96 as shown herein serve the function of fitting two linear rates of change to a curve. However, experiments made with such lens mechanism, comprising the disclosed combination arrangement of bellows and springs, have proven that such curvilinear rate of change of focus is very closely approximated between 3,000 and 50,000 feet altitude with negligible deviations. The auxiliary bellows 96 herein are used to modify the rate of bellows compensation at the lower altitudes. At about 15,000 feet above sea level each of these four auxiliary bellows 96 has its cap flange 100 come up against the stop nut 103 on stop sleeve 101 thereupon rendering these auxiliary bellows inactive. The remaining six main bellows then carry on the expansive action, against all the springs 108, at a slower rate of movement. The focus is thus automatically adjusted by the movement of the ring 94 with the barrel 66 and the rear lens 65, so as to compensate automatically for the usual shift of focal position due to variation in altitude and atmospheric pressure and thus keep the focus fixed regardless of altitude.

I claim:

1. In an aerial camera containing a lens system comprising a plurality of lenses mounted in optical seriatim and including a single movable lens constituting the rear element thereof and also means whereby said rear lens is mounted to be movable manually relative to the other lenses, the improvement which comprises compensating means including pressure responsive means and also companion control means both operatively connected with said rear lens mounting means and being automatically actuated by variations in altitude and atmospheric pressure to move said rear lens relative to the other lens, whereby to compensate for the optical refraction of said lenses and the shift of focus due to such change in altitude and pressure and keep the image substantially fixed.

2. The subject matter set forth in claim 1, wherein said pressure responsive means comprise bellows and said control means comprise springs acting contra to the bellows and between which bellows and springs said rear lens is in effect operatively suspended.

3. An aerial camera lens device comprising a plurality of lenses mounted in optical seriatim therein including an intermediate lens and a rear lens, a member carrying said intermediate lens, a focusing member and associated means carrying the rear lens and being movable together relative to said intermediate lens, compensating means operatively connected with both of said two members and including a plurality of bellows actuated by variations in altitude and atmospheric presure and also other means comprising a plurality of springs arranged to control its action, wherebetween the focusing member is in effect mounted to automatically move the same with the rear lens therein along its optical axis relative to the other member and lens while the latter is held stationary and compensate for the shift of focus due to such variations.

4. An aerial camera lens device comprising a plurality of lenses mounted in optical seriatim therein including a rear lens, a stationary member carrying one of the other lenses, a focusing member and means thereon carrying the rear lens and being movable therewith relative to said stationary member and lens, compensating means including a plurality of bellows and also spring means to restrain and control the action of the bellows and both operatively connected with said two members, whereby the rear lens is in effect mounted to be actuated by variations in altitude and pressure so as to automatically move the member with the rear lens therein along its optical axis relative to the other lens and its member to compensate for the shift of focus due to such variations.

5. An aerial camera lens device comprising a plurality of lenses mounted in optical seriatim therein including a rear lens and an intermediate lens, a stationary member carrying the intermediate lens, base means associated with said member, means for manually adjusting and setting said base means relative to said member, a member and means thereon carrying said rear lens and being movable together along the optical axis relative to said intermediate lens, means projecting from said movable member, and pressure responsive means and control spring means operatively connected with said base means and with said projecting means, whereby to move said movable member with the rear lens automatically relative to said intermediate lens, so as to compensate for the change of focal position as the lenses become optically differently refractive by moving into different altitudes.

6. An aerial camera lens device comprising a tubular casing and a plurality of lenses mounted in optical seriatim therein including an intermediate lens and a rear lens, a stationary barrel in the casing and carrying the intermediate lens, base means associated with said barrel, means for manually adjusting and setting said base means relative to said barrel, another barrel and means thereon carrying said rear lens and being slidable on the stationary barrel to move the rear lens relative to said intermediate lens, means projecting from said slidable barrel, sets of bellows positioned around said barrels being operatively connected with said base means and with said projecting means to be automatically actuated by variations in altitude and atmospheric pressure, said bellows including a main set which is constantly operative and also an auxiliary set which is operative only to increase the rate of compensation at the lower altitudes and is stopped at a certain elevation, and means active to restrain and control the effects of said bellows, whereby to move said barrel with the rear lens automatically relative to said intermediate lens as the lenses become optically differently refractive by moving into different altitudes and thereby keep the focus fixed.

7. An aerial camera lens device comprising a tubular casing and a plurality of lenses mounted in optical seriatim therein including an intermediate lens and a rear lens, a stationary barrel in the casing and carrying the intermediate lens, base means mounted around said barrel, means for manually adjusting and setting said base means relative to said barrel, a movable barrel and means thereon carrying said rear lens and being slidable on the stationary barrel to move the rear lens relative to said intermediate lens, means surrounding and projecting outwardly from said slidable barrel, sets of bellows positioned around said barrels being operatively connected with said projecting means and with means carried by said base means to be automatically actuated by variations in altitude and atmospheric pressure, said bellows including a main set which is constantly operative and also an auxiliary set which is operative only to increase the rate of compensation at the lower altitudes and is stopped at a certain elevation, and control springs connected to said base means and to said projecting means and active to restrain said bellows, whereby to move said barrel with the rear lens automatically relative to said intermediate lens as the lenses become optically differently refractive by moving into different altitudes and thereby keep the focus fixed.

8. An aerial camera lens device comprising a plurality of lenses mounted in optical seriatim therein including a rear lens and an intermediate lens, a stationary barrel carrying the intermediate lens, base means associated with said barrel, means for manually adjusting and setting said base means relative to said barrel, a focusing barrel movable longitudinally of the first said barrel, means carrying said rear lens and being connected to and movable along with said focusing barrel relative to said intermediate lens, means projecting from said focusing barrel, and compensating means connected with said base means and with said projecting means and including pressure responsive means and control spring means wherebetween said projecting means is operatively suspended and together with said rear lens is automatically actuated by variations in altitude and atmospheric pressure, said pressure responsive means including a main set under higher than atmospheric pressure which is constantly operative and also an auxiliary set under lower than atmospheric pressure which is operative only to increase the rate of compensation at the lower altitudes and is stopped at a certain elevation, whereby to move said barrel with the rear lens automatically relative to said intermediate lens as the lenses become optically differently refractive by moving into different altitudes and thereby keep the focus fixed.

9. An aerial camera lens device comprising a plurality of lenses mounted in optical seriatim therein including a rear lens and an intermediate lens, a stationary barrel carrying the intermediate lens, a base ring mounted around said barrel, means for manually adjusting and setting said base ring relative to said barrel, a focusing barrel movable longitudinally of the first said barrel, a cell carrying said rear lens therein and being connected to and movable along with said focusing barrel relative to said intermediate lens, a ring projecting outwardly from said focusing barrel, and compensating means connected with said base ring and with said projecting ring and including pressure responsive means and control spring means positioned around said barrels and wherebetween said projecting ring is operatively suspended and together with said rear lens is automatically actuated by variations in altitude and atmospheric pressure, said pressure responsive means including a main set under relatively high pressure which is constantly operative and also an auxiliary set under relatively low pressure which is operative only to increase the rate of compensation at the lower altitudes and is stopped at a certain elevation, whereby to move said barrel with the rear lens automatically relative to said intermediate lens as the lenses become optically differently refractive by moving into different altitudes and thereby keep the focus fixed.

10. The camera lens device as set forth in claim 9 having in addition a jacket enclosing the elements recited in that claim, and in addition thereto an electric heater and a thermostat mounted therein, an electric circuit leading to the heater and including the thermostat and manually openable means mounted on the jacket exterior for regulating the thermostat.

CHARLES F. AVILA.

REFERENCES CITED

The following references are of record in the file of this patent:

UNITED STATES PATENTS

| Number | Name | Date |
| --- | --- | --- |
| 2,404,746 | Rylsky et al. | Jan. 23, 1946 |

FOREIGN PATENTS

| Number | Country | Date |
| --- | --- | --- |
| 28,836 | Great Britain | 1912 |
| 666,563 | Germany | Oct. 24, 1938 |